July 12, 1927.
E. DI GIULIO
1,635,823
PARACHUTE
Filed Feb. 25 1927    2 Sheets-Sheet 1
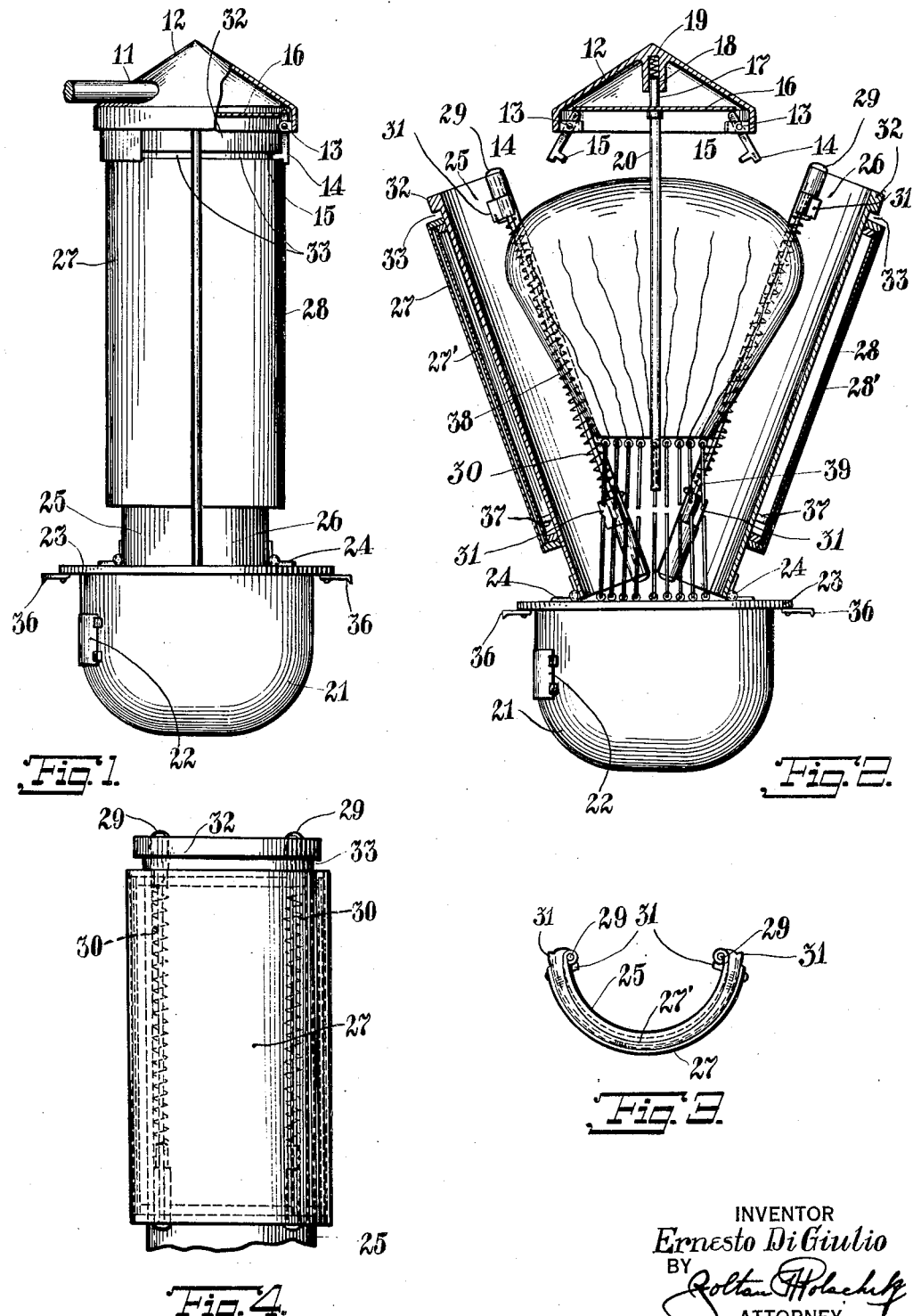
INVENTOR
Ernesto Di Giulio
BY
Zoltan Holachik
ATTORNEY July 12, 1927.
E. DI GIULIO
1,635,823
PARACHUTE
Filed Feb. 25 1927
2 Sheets-Sheet 2
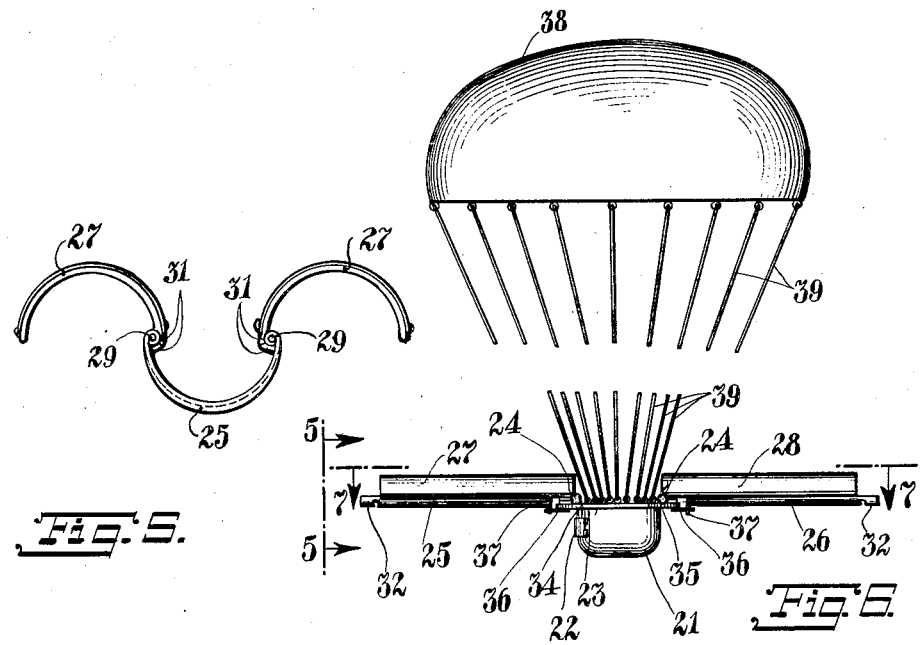
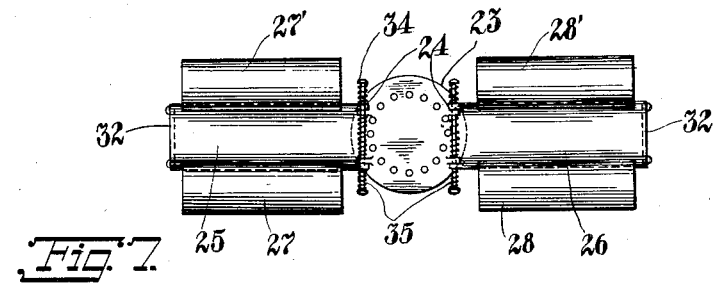
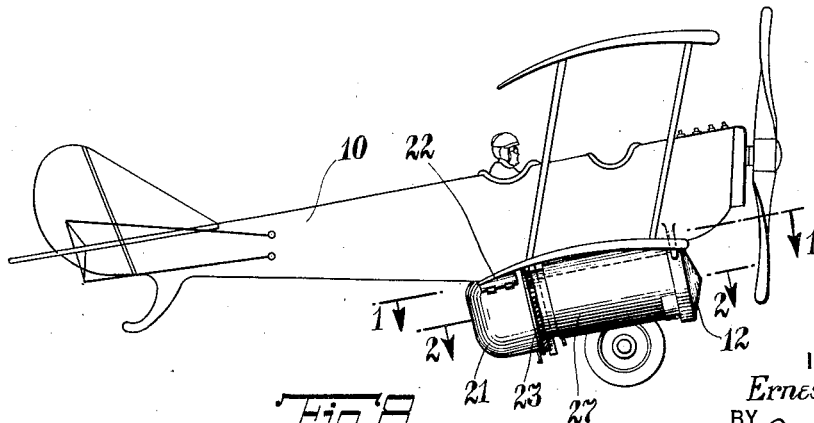
INVENTOR
Ernesto DiGiulio
BY
ATTORNEY Patented July 12, 1927.

1,635,823

UNITED STATES PATENT OFFICE.

ERNESTO DI GIULIO, OF LYNN, MASSACHUSETTS.

PARACHUTE.

Application filed February 25, 1927. Serial No. 170,957.

This invention relates generally to safety devices for flying machines, and has more particular reference to a novel type of parachute. This application is a continuation in part of an application filed by me on May 29, 1925, Serial Number 33,598.

The invention has for an object the provision of an improved parachute which will act efficiently, and which is normally protected against exterior influences of weather conditions.

For further comprehension of the invention, and of the objects and advantages thereof, reference will be had to the following description and accompanying drawings, and to the appended claims in which the various novel features of the invention are more particularly set forth.

Referring to the drawings forming a material part of this disclosure:—

Fig. 1 is a sectional view, taken on the line 1—1 of Fig. 8, certain parts being broken disclosing other interior parts.

Fig. 2 is a sectional view taken on the line 2—2 of Fig. 8, a few seconds after the parachute has been released from the flying machine, certain parts not being shown in sections.

Fig. 3 is a detail top view of one of the folded wings used in the device.

Fig. 4 is a front view thereof.

Fig. 5 is a detail edge view of one of the wings of the device with the wing members thereof in unfolded, or extended position, as seen in the direction of the arrows 5—5 of Fig. 6.

Fig. 6 is a side elevation of the parachute in completely opened, position, descending and free from the flying machine.

Fig. 7 is a horizontal sectional view taken on the line 7—7 of Fig. 6.

Fig. 8 is a side elevational view of a flying machine equipped with the invention parachute.

The reference numeral 10 indicates generally a flying machine, having posts 11 projecting from the bottom thereof and connected to the side of a cone member 12. Pivoted as at 13 to the inner side of the bottom of the cone member 12 are levers 14 having projecting tongues 15. A disc 16 is housed in the cone member 12 and has a central projecting rod 17 slidable in an aperture 18 in the cone member. A spring 19 urges the rod 17 and disc 16 outwards. Another rod 20 projects from the other side of disc 16.

A gondola 21 has a door 22, and a top flange 23. Hingedly connected as at 24 to the top flange 23 are the center wing members 25 and 26 of a pair of wings, completed by end wing members 27, 27' and 28, 28' hingedly connected as at 29 to the center wing members 25 and 26 respectively. Springs 30 are coaxially mounted on the hinges 29, and act between the center wing member and the end wing members, urging the end wing members into the position shown in Figs. 5, 6, and 7, further opening of the wings being arrested by stops 31. The center wing members 25 are formed with top flanges 32, and the end wing members are shorter than the center wing members so that a groove 33 exists when the end wing members are folded upon the center wing members as shown in Figs. 1 to 4. The tongues 15 of the levers 14 are engageable in this groove. Co-axial with the hinges 24 are extension rods 34 with springs 35 thereon, normally urging the wings downward to positions shown in Figs. 6 and 7, and to lock the wings in this position, catches 36 on the flange 23 are engageable with complementary catches 37 on the center wing members 25, 26. A parachute sail 38 is attached to the gondola 21 by ropes 39, for convenience shown broken on the drawing.

The device is set in condition for operation by collapsing the parachute sail 38 as shown in Fig. 2, folding the end wing members against the center wing members as shown in Fig. 3 against the unfolding action of springs 30, forcing the thus folded wings together against the action of springs 35, engaging the tongue 15 in the groove 33, and thereupon spring 19 forces the disc 16 between the backs of the levers 14, locking the folded wings to the cone shaped member 12, incidentally, the wings cannot open since they are locked by the levers 14. The doorway 22 of the gondola 21 is placed in a position so as to be readily useable by occupants of the flying machine 10. The flying machine may now hop off on its journey. If an emergency arises and the occupants of the flying machine desire to leave the same, they enter the gondola 21 through the door 22 closing the door after them. Thereafter, they press against the rod 20, moving the disc 16 from behind the levers 14, against the action of spring 19, that is, the disc is moved from the position shown in Fig. 1 to the position shown in Fig. 2. Springs 35 act to open the wings, levers 14 turn on their pivots 13, and the parachute leaves the flying machine and starts falling. Attention is directed that the cone member 12, together with the levers 14, disc 16, and rods 17 and 20 remain with the flying machine, while only the gondola 21, the wings, and the parachute sail 38 fall. The springs 30 act to open the wings, that is, they urge the end wing members from against the center wing members to a position as shown in Figs. 5 to 7. Simultaneously, the springs 35 continue to act until the wings are entirely open, that is till the catches 36, 37 engage each other, locking the wings in their open condition. The relatively uprushing air opens the parachute sail 38, and the falling parachute descends slowly and safely. In this condition the wings aid in a slow descent of the parachute. In the original condition, that is when the parachute was attached to the flying machine, the wings shielded the parachute sail from weather strains.

While I have illustrated and described my invention with some degree of particularity. I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. A parachute with associated holding and releasing means for a flying machine, comprising a cone shaped member secured to the flying machine, a gondola, central wing members hingedly attached thereto, end wing members hingedly attached to the central wing members, the end wing members being foldable against the central wing members, means for normally urging the end wing members to open position, means for normally urging the central wing members to open position, means for releasably securing the end and central wings in closed position to the cone shaped member, and a collapsed parachute sail attached to the gondola, and housed within the folded wings.

2. A parachute with associated holding and releasing means for a flying machine, comprising a cone shaped member secured to the flying machine, a gondola, central wing members hingedly attached thereto, end wing members hingedly attached to the central wing members, the end wing members being foldable against the central wing members, means for normally urging the end wing members to open position, means for normally urging the central wing members to open position, a latch secured to the gondola, a complementary latch secured to the central wing, and engageable with each other to hold the central wing in open position, means for releasably securing the end and central wings in closed position to the cone shaped member, and a collapsed parachute sail attached to the gondola, and housed within the folded wings.

3. A parachute with associated holding and releasing means for a flying machine, comprising a cone shaped member secured to the flying machine, a gondola, central wing members hingedly attached thereto, end wing members hingedly attached to the central wing members, the end wing members being foldable gainst the central wing members, means for normally urging the end wing members to open position, means for normally urging the central wing members to open position, means for releasably securing the end and central wings in closed position to the cone shaped member, said latter means consisting of levers pivoted to the cone shaped member, means for engaging the levers to the wings in a certain position of the levers, a disc slidably mounted in the cone shaped member, a spring urging the disc to lock the levers in the said certain position, and a rod attached to the disc for manually moving the disc from the locking position, and a collapsed parachute sail attached to the gondola, and housed within the folded wings.

In testimony whereof I have affixed my signature.

ERNESTO DI GIULIO.